US009118375B2

(12) United States Patent
Naguib et al.

(10) Patent No.: US 9,118,375 B2
(45) Date of Patent: *Aug. 25, 2015

(54) MINIMUM MEAN SQUARED ERROR APPROACH TO INTERFERENCE CANCELLATION AND MAXIMUM LIKELIHOOD DECODING OF SPACE-TIME BLOCK CODES

(71) Applicant: AT&T Intellectual Property II, L.P., Atlanta, GA (US)

(72) Inventors: Ayman F. Naguib, New Providence, NJ (US); Nambirajan Seshadri, Chatham, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/790,570

(22) Filed: Mar. 8, 2013

(65) Prior Publication Data

US 2013/0259168 A1 Oct. 3, 2013

Related U.S. Application Data

(63) Continuation of application No. 12/568,863, filed on Sep. 29, 2009, now Pat. No. 8,396,154, which is a continuation of application No. 10/778,589, filed on Feb. 13, 2004, now Pat. No. 7,620,128, which is a (Continued)

(51) Int. Cl.
*H04L 27/06* (2006.01)
*H04B 7/08* (2006.01)

(Continued)

(52) U.S. Cl.
CPC .......... *H04B 7/0891* (2013.01); *H04B 1/71055* (2013.01); *H04B 1/71057* (2013.01); *H04L 1/0618* (2013.01); *H04L 1/08* (2013.01); *H04B 7/0669* (2013.01)

(58) Field of Classification Search
CPC ................. H04L 1/0054; H04L 25/497; G11B 20/10009; G11B 20/10175; G11B 20/10055; G11B 20/1833
USPC ........... 375/341, 267, 219, 148, 349; 455/132
See application file for complete search history.

(56) References Cited

U.S. PATENT DOCUMENTS 4,057,758 A 11/1977 Hattori et al.
4,715,048 A 12/1987 Masamura (Continued)

OTHER PUBLICATIONS

Harald Elders-Boll et al (Spreading Sequences for Zero-Forcing DS-CDMA Multiuser Detectors, Personal, Indoor and Mobile Radio Communications, 1997. Waves of the Year 2000. PIMRC '97., The 8th IEEE International Symposium on (vol. 1) , Sep. 1-4, 1997 , pp. 53-57 vol. 1).*

*Primary Examiner* — Shuwang Liu
*Assistant Examiner* — Helene Tayong
(74) *Attorney, Agent, or Firm* — Abel Law Group, LLP

(57) ABSTRACT

Block-encoded transmissions of a multi-antenna terminal unit are effectively detected in the presence of co-channel interfering transmissions when the base station has a plurality of antennas, and interference cancellation is combined with maximum likelihood decoding. More specifically, the signals received at the base station antennas are combined in a linear combination that relates to the channel coefficients between the various transmitting terminal units and the base antennas. By selecting proper coefficients for the linear combination and choosing probable transmitted signals that minimize a minimum mean squared error function, the signals of the various terminal units are canceled when detecting the signal of a particular unit. In another embodiment of the invention, the basic approach is used to obtain an initial estimate of the signals transmitted by one terminal unit, and the contribution of those signals is removed from the received signals prior to detecting the signals of other terminal units.

6 Claims, 1 Drawing Sheet

Related U.S. Application Data continuation of application No. 09/167,380, filed on Oct. 6, 1998, now Pat. No. 6,693,982.

(60) Provisional application No. 60/061,145, filed on Oct. 6, 1997.

(51) Int. Cl.
*H04B 1/7105* (2011.01)
*H04L 1/06* (2006.01)
*H04L 1/08* (2006.01)
*H04B 7/06* (2006.01)

(56) References Cited

U.S. PATENT DOCUMENTS

| | | |
|---|---|---|
| 5,263,033 A | 11/1993 | Seshadri |
| 5,566,209 A | 10/1996 | Forssen et al. |
| 5,615,409 A | 3/1997 | Forssen et al. |
| 5,790,606 A | 8/1998 | Dent |
| 5,796,788 A | 8/1998 | Bottomley |
| 5,822,380 A * | 10/1998 | Bottomley ............... 375/347 |
| 5,933,768 A * | 8/1999 | Skold et al. .............. 455/296 |
| 5,938,789 A * | 8/1999 | Itoi ............................ 714/795 |
| 5,946,345 A * | 8/1999 | Karlsson et al. .......... 375/150 |
| 5,970,060 A * | 10/1999 | Baier et al. ............... 370/342 |
| 6,088,408 A | 7/2000 | Calderbank et al. |
| 6,148,041 A | 11/2000 | Dent |
| 6,151,484 A | 11/2000 | Ramesh |
| 6,178,196 B1 | 1/2001 | Naguib et al. |
| 6,185,258 B1 | 2/2001 | Alamouti et al. |
| 6,188,736 B1 | 2/2001 | Lo et al. |
| 6,219,387 B1 * | 4/2001 | Glover ....................... 375/341 |
| 6,240,099 B1 | 5/2001 | Lim et al. |
| 6,693,982 B1 | 2/2004 | Naguib et al. |
| 7,120,200 B2 | 10/2006 | Alamouti et al. |
| 7,620,128 B2 | 11/2009 | Naguib et al. |

\* cited by examiner

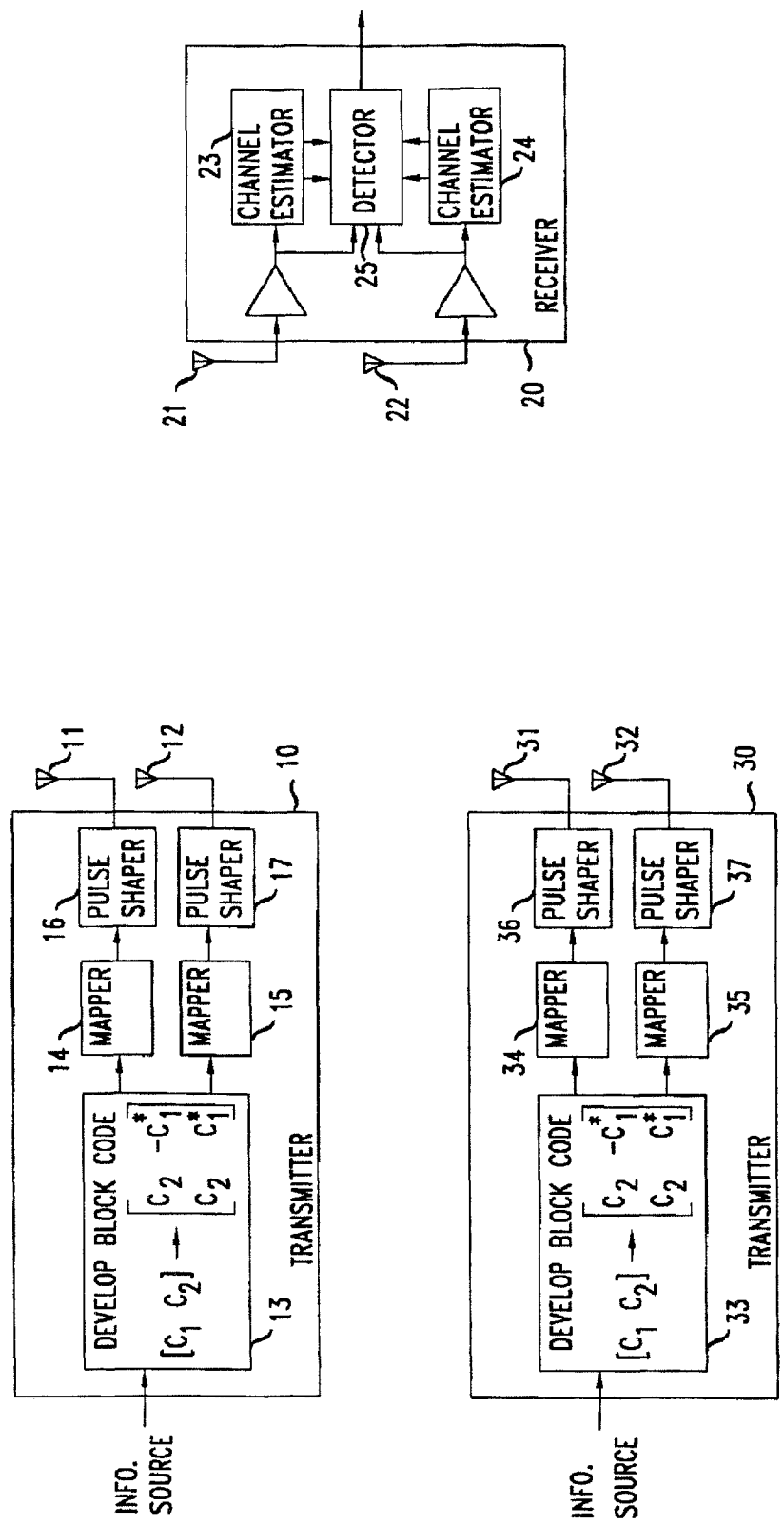

MINIMUM MEAN SQUARED ERROR APPROACH TO INTERFERENCE CANCELLATION AND MAXIMUM LIKELIHOOD DECODING OF SPACE-TIME BLOCK CODES

REFERENCE TO RELATED APPLICATIONS

This application is a continuation of U.S. patent application Ser. No. 12/568,863 filed Sep. 29, 2009, which is a continuation of U.S. patent application Ser. No. 10/778,589, now U.S. Pat. No. 7,620,128, which is a continuation of U.S. patent application Ser. No. 09/167,380 filed Oct. 6, 1998, now U.S. Pat. No. 6,693,982, which claims the benefit of U.S. Provisional Application No. 60/061,145 filed Oct. 6, 1997. U.S. patent application Ser. No. 12/568,863 is hereby incorporated by reference. This application is also related to U.S. patent application Ser. No. 09/074,224, filed May 7, 1998, now U.S. Pat. No. 6,185,258, and to U.S. patent application Ser. No. 09/149,163, filed Sep. 4, 1998, now U.S. Pat. No. 6,178,196.

BACKGROUND OF THE INVENTION

This invention relates to wireless communication and, more particularly, to techniques for effective wireless communication in the presence of fading, co-channel interference, and other degradations.

Rapid growth in mobile computing and other wireless data services is inspiring many proposals for high speed data services in the range of 64-144 kbps for micro cellular wide area and high mobility applications and up to 2 Mbps for indoor applications. Research challenges include the development of efficient coding and modulation, and signal processing techniques to improve the quality and spectral efficiency of wireless communications and better techniques for sharing the limited spectrum among different high capacity users.

The physical limitation of the wireless channel presents a fundamental technical challenge for reliable communications. The channel is susceptible to time-varying noise, interference, and multipaths. Power and size limitations of the communications and computing device in a mobile handset constitute another major design consideration. Most personal communications and wireless services portables are meant to be carried in a briefcase and/or pocket and must, therefore, be small and lightweight. This translates to a low power requirement since small batteries must be used. However, many of the signal processing techniques which may be used for reliable communications and efficient spectral utilization demand significant processing power, precluding the use of low power devices. Continuing advances in VLSI and integrated circuit technology for low power applications will provide a partial solution to this problem. Still, placing most of the signal processing burden on fixed locations (base stations) with relatively larger power resources than the mobile units will, likely, continue to be the trend in wireless systems design.

Perhaps the single most important parameter in providing reliable communications over wireless channels is diversity. Diversity techniques, which may be used include time, frequency, and space diversity.

Time diversity: channel coding in combination with limited interleaving is used to provide time diversity. However, while channel coding is extremely effective in fast fading environments (high mobility), it offers very little protection under slow fading (low mobility) unless significant interleaving delays can be tolerated.

Frequency diversity: signals transmitted over different frequencies induce different multipath structures and independent fading. However, when the multipath delay spread is small compared to the symbol period, frequency diversity is not helpful.

Space diversity: the receiver/transmitter uses multiple antennas that are separated for reception/transmission and/or differently polarized antennas to create independent fading channels. Currently, multiple antennas at base-stations are used for receive diversity at the base. However, it is difficult to have more than two antennas at the mobile unit due to the size and cost of multiple chains of RF conversion.

Previous work on transmit diversity can be classified into three broad categories: schemes using feedback, schemes with feedforward or training information but no feedback, and blind schemes. The third category (blind schemes) relies primarily on multiple transmit antennas combined with channel coding to provide diversity. An example of this approach is disclosed in the aforementioned copending application Ser. No. 09/074,224, entitled "Transmitter Diversity Technique for Wireless Communications," filed May 7, 1998.

SUMMARY OF THE INVENTION

Improved performance is attained in an illustrative arrangement where K synchronized terminal units that transmit on N antennas to a base station having M≥K antennas, by combining interference cancellation (IC) and maximum likelihood (ML) decoding. More specifically, space-time block coding is employed in transmitters that employ N transmit antennas each, and the signals are received in a receiver that employs M receiving antennas. In accordance with the processing disclosed herein, by exploiting the structure of the space-time block code, K−1 interfering transmitting units are cancelled at the receiver, regardless of the number of transmitting antennas, N, when decoding the signals transmitted by a given terminal unit. In another embodiment of the principles of this invention, signals of a first terminal unit are decoded first, and the resulting decoded signals are employed to cancel their contribution to the signals received at the base station antennas while decoding the signals of the remaining K−1 terminal units. The process is repeated among the remaining K−1 terminal units. That is, among the remaining K−1, signals of a first terminal unit is decoded first and the resulting decoded signals are employed to cancel their contribution to the signals received at the base station antennas while decoding the signals of the remaining K−2 terminal units, and so on. This procedure is repeated K times, each time starting with decoding signals of a particular terminal unit. This successive procedure will yield additional performance improvement.

Both zero-forcing (ZF) and minimum mean-squared error (MMSE) interference cancellation (IC) and maximum likelihood (ML) techniques are disclosed.

BRIEF DESCRIPTION OF THE DRAWING

FIG. 1 depicts an arrangement that, illustratively, includes a receiving base station (20) and two transmitting terminal units (10 and 30).

DETAILED DESCRIPTION

FIG. 1 illustrates two transmitting units and one receiving unit that comport with the principles disclosed herein. However, this is merely illustrative, and the disclosed method is useful for more than two terminals (K>2).

Single Transmitting Unit

Transmitting unit 10 may correspond to the transmitting circuitry in a terminal unit, while receiving unit 20 may correspond to the receiving circuitry in a base station. Terminal unit 30 is shown identical to terminal unit 10. It should be understood, of course, that each terminal unit has a receiving circuit, and the base station has a transmitting circuit. The terminal units are shown to have two antennas each. Receiving unit 20 is also shown to have two receiving antennas. Here, too, it should be kept in mind that, generally, any number, M≥2, of receiving antennas can be had. Particular advantage is realized when M≥K. Since the mathematical treatment below is couched in general matrix notations, the expressions are valid for any number K and/or M.

Considering terminal unit 10 (terminal unit 30), the information source provides input symbols to element 13 (element 33) which develops a block code. The symbols are divided into groups of two symbols each, and at a given symbol period, the two symbols in each group $\{c_1, c_2\}$ are transmitted simultaneously from the two antennas. The signal transmitted from antenna 11 (antenna 31) is $c_1$ and the signal transmitted from antenna 12 (antenna 32) is $c_2$. In the next symbol period, the signal $c_2^*$ is transmitted from antenna 11 (antenna 31) and the signal $c_1^*$ is transmitted from antenna 12 (antenna 32). The symbols are modulated prior to transmission with constellation mappers 14 and 15 (constellation mappers 34 and 35), followed by pulse shapers 16 and 17 (pulse shapers 36 and 37), respectively, in a conventional manner.

In receiver 20, signals are received by antennas 21 and 22 and are applied to detector 25.

In the mathematical development of the algorithms disclosed herein, it is assumed that the channel from each of the two transmit antennas remains fixed over two consecutive symbol periods. That is, $$h_i(nT) = h_i((n+1)T), i=1,2. \quad (1)$$

To ascertain the channel characteristics, the transmitter carries out a calibration session, during which pilot signals or tones are transmitted. The signals received during the calibration session are applied to channel estimator circuits 23 and 234, which are well known circuits, and the channel characteristics are thus obtained.

When only transmitter 10 is considered, the received signals at antenna 21 can be expressed as $$r_{11} = h_{11} c_1 + h_{12} c_2 + \eta_1 \quad (2)$$

$$r_{12} + h_{11} c_2^* + h_{12} c_1^* + \eta_2 \quad (3)$$

where $r_{11}$ and $r_{12}$ are the received signals over two consecutive symbol periods, $h_{11}$ denotes the fading channel between transmit antenna 11 and receive antenna 21, $h_{12}$ denotes channel between transmit antenna 12 and receive antenna 21, and $\eta_1$ and $\eta_2$ are noise terms, which are assumed to be complex Gaussian random variables with zero mean and power spectral density $N_0/2$ per dimension. Defining the vectors $r = [r_{11} \, r_{12}^*]^T$, $c = [c_1 \, c_2]^T$, and $\eta = [\eta_1 \, \eta_2]^T$, equations (2) and (3) can be rewritten in a matrix form as $$r = H \cdot c + \eta \quad (4)$$

where the channel matrix H is defined as $$H = \begin{bmatrix} h_{11} & h_{12} \\ h_{12}^* & -h_{11}^* \end{bmatrix}. \quad (5)$$

The vector $\eta$ is a complex Gaussian random vector with zero mean and covariance $N_0 \cdot I$. Defining C as the set of all possible symbol-pairs $c = \{c_1, c_2\}$, and assuming that all symbol pairs are equi-probable, it can be easily shown that the optimum maximum likelihood (ML) decoder selects from C the symbol-pair E that minimizes the expression $\|r - H \cdot \hat{c}\|^2$. This can be written as $$\hat{c} = \underset{\hat{c} \in C}{\operatorname{argmin}} \|r - H \cdot \hat{c}\|^2. \quad (6)$$

It was shown by S. Alamouti in "Space Block Coding: A simple Transmitter Diversity Scheme for wireless Communications," submitted to IEEE JSAC, September 1997 that the diversity order of the above space-time block code is equivalent to that of a two branch maximal ratio receive combining (MRRC). Because of the orthogonality of the matrix H, Alamouti also showed that this decoding rule decomposed into two separate decoding rules for $c_1$ and $c_2$. The uncertainty, $\Delta_c$, of the decoded symbols $\hat{c}$ is defined as $$\Delta_c = \|r - H \cdot \hat{c}\|^2. \quad (7)$$

It should be noted that the above analysis addresses only receive antenna 21. When receiver 20 uses both antennas, i.e., antennas 21 and 22, two received signal vectors $r_1$ and $r_2$ can be defined for antenna 21 and 22, respectively, as $$r_1 = H_1 \cdot c + \eta_1 \quad (8)$$

$$r_2 = H_2 \cdot c + \eta_2 \quad (9)$$

where $H_1$ and $H_2$ are the channel matrices to receive antennas 21 and 22, respectively, and $\eta_1$ and $\eta_2$ are the corresponding noise vectors. That is, $$H_1 = \begin{bmatrix} h_{11} & h_{12} \\ h_{12}^* & -h_{11}^* \end{bmatrix}, \text{ and } H_2 = \begin{bmatrix} h_{21} & h_{22} \\ h_{22}^* & -h_{21}^* \end{bmatrix}, \quad (9a)$$

where $h_{21}$ denotes the channel between transmit antenna 12 and receive antenna 22, and $h_{22}$ denotes the channel between transmit antenna 11 and receive antenna 22. In this case, the ML decoding rule is $$\hat{c} = \underset{\hat{c} \in C}{\operatorname{argmin}} (\|r_1 - H_1 \cdot \hat{c}\|^2 + \|r_2 - H_2 \cdot \hat{c}\|^2), \quad (10)$$

and the uncertainty of the decoded symbols is defined as $$\Delta_c = \|r_1 - H_1 \cdot \hat{c}\|^2 + \|r_2 - H_2 \cdot \hat{c}\|^2. \quad (11)$$

As before, both the matrices $H_1$ and $H_2$ are orthogonal matrices and hence the above decoding rule also decomposes to two separate decoding rules for $c_1$ and $c_2$. Note that the rate of transmission (of information symbols) in the space-time block coding scheme is 1

Interference Cancellation and ML Decoding: BASIC CASE

FIG. 1, however, shows two terminal units, and the issue that needs to be addressed is the detection performance at the base station receiver when the two terminal units transmit over the same time and frequency channel.

In the notation below, $g_{11}$ denotes the fading channel between transmit antenna 31 and receive antenna 21, $g_{12}$ denotes the channel between antenna 31 and antenna 21, $g_{21}$ denotes the channel between antenna 32 and antenna 22, and $g_{22}$ denotes the channel between antenna 32 and antenna 22.

Also, $\{c_1,c_2\}$ and $\{s_1,s_2\}$ denote the two symbols transmitted from terminal units 10 and 30, respectively.

At receiver 20, the received signals over two consecutive symbol periods at receive antenna 21, $r_{11}$ and $r_{12}$ are $$r_{11}=h_{11}c_1+h_{12}c_2+g_{11}s_1+g_{12}s_2+\eta_{11} \tag{12}$$

$$r_{12}=-h_{11}c_2{}^*+h_{12}c_1{}^*-g_{11}s_2{}^*+g_{12}s_1{}^*+\eta_{12} \tag{13}$$

Defining $r_1=[r_{11}r_{12}{}^*]^T$, $c=[c_1c_2]^T$, $s=[s_1s_2]^T$, and $n_1=[n_{11}\ \eta_{12}{}^*]^T$ equations (12) and (13) can be rewritten in matrix form as $$r_1=H_1\cdot c+G_1\cdot s+n_1 \tag{14}$$

where the channel matrices $H_1$ and $G_1$ between the transmitter units 10 and 30 and receive antenna 21 are given by $$H_1=\begin{bmatrix} h_{11} & h_{12} \\ h_{12}^* & -h_{11}^* \end{bmatrix}, \text{ and } G_1=\begin{bmatrix} g_{11} & g_{12} \\ g_{12}^* & -g_{11}^* \end{bmatrix} \tag{15}$$

The vector $n_1$ is a complex Gaussian random vector with zero mean and covariance $N_0\cdot I$. Similarly, the received signals over two consecutive symbol periods at receive antenna 22, $r_{21}$ and $r_{22}$ are $$r_{21}=h_{21}c_1+h_{22}c_2+g_{21}s_1+g_{22}s_2+\eta_{21} \tag{16}$$

$$r_{22}=-h_{22}c_2{}^*+h_{22}c_1-g_{21}s_2{}^*+g_{22}s_1{}^*+\eta_{22} \tag{17}$$

In a similar fashion, defining $r_2=[r_{21}r_{22}{}^*]^T$ and $n_2=[\eta_{21}\eta_{22}{}^*]^T$ equations (16) and (17) can be rewritten as $$r_2=H_2\cdot c+G_2\cdot s+n_2 \tag{18}$$

where the channel matrices $H_2$ and $G_2$ between transmitter units 10 and 30 and antenna 22 are given by $$H_2=\begin{bmatrix} h_{21} & h_{22} \\ h_{22}^* & -h_{21}^* \end{bmatrix}, \text{ and } G_2=\begin{bmatrix} g_{21} & g_{22} \\ g_{22}^* & -g_{21}^* \end{bmatrix} \tag{19}$$

Equations (14) and (18) can be combined to yield the matrix form $$r=\begin{bmatrix} r_1 \\ r_2 \end{bmatrix}=\begin{bmatrix} H_1 & G_1 \\ H_2 & G_2 \end{bmatrix}\begin{bmatrix} c \\ s \end{bmatrix}+\begin{bmatrix} n_1 \\ n_2 \end{bmatrix}. \tag{20}$$

Zero-Forcing IC and ML Decoding Scheme:
In this case, a matrix W is chosen such that $$W\cdot\begin{bmatrix} r_1 \\ r_2 \end{bmatrix}=\begin{bmatrix} \tilde{r}_1 \\ \tilde{r}_2 \end{bmatrix}=\begin{bmatrix} \tilde{H} & 0 \\ 0 & \tilde{G} \end{bmatrix}\cdot\begin{bmatrix} c \\ s \end{bmatrix}+\begin{bmatrix} \tilde{n}_1 \\ \tilde{n}_2 \end{bmatrix} \tag{21}$$

We can find an appropriate matrix W by realizing that $$\begin{bmatrix} H_1 & G_1 \\ H_2 & G_2 \end{bmatrix}^{-1}=\begin{bmatrix} A_1^{-1} & 0 \\ 0 & A_2^{-1} \end{bmatrix}\begin{bmatrix} I & -G_1G_2^{-1} \\ -H_2H_1^{-1} & I \end{bmatrix} \tag{22}$$

where $$A_1=H_1-G_1G_2^{-1}H_2 \text{ and } A_2=G_2-H_2H_1^{-1}G_1 \tag{23}$$

Hence, if we select W as $$W=\begin{bmatrix} I & -G_1G_2^{-1} \\ -H_2H_1^{-1} & I \end{bmatrix} \tag{24}$$

we will have $$W\cdot\begin{bmatrix} r_1 \\ r_2 \end{bmatrix}=\begin{bmatrix} \tilde{r}_1 \\ \tilde{r}_2 \end{bmatrix}=\begin{bmatrix} \tilde{H} & 0 \\ 0 & \tilde{G} \end{bmatrix}\cdot\begin{bmatrix} c \\ s \end{bmatrix}+\begin{bmatrix} \tilde{n}_1 \\ \tilde{n}_2 \end{bmatrix} \tag{25}$$

where $$\tilde{H}=H_1-G_1G_2^{-1}H_2$$

$$\tilde{G}=G_2-H_2H_1^{-1}G_1.$$

$$\tilde{n}_1=n_1-G_1G_2^{-1}n_2$$

$$\tilde{n}_2=n_2-H_2H_1^{-1}n_1 \tag{26}$$

From equation (25) it can be easily observed that the modified received signal vector $\tilde{r}_1$ contains signals only from transmitter 10 (i.e. signals from transmitter 30 have been canceled or removed) and, correspondingly, the modified received signal vector $\tilde{r}_2$ contains signals only from transmitter 30 (i.e. signals from transmitter 10 have been canceled or removed). A number of other attributes can be shown from the above to be true.

1) the modified noise vector $\tilde{n}_1$ is a zero mean complex Gaussian random vector with covariance $$R_{n1}=N_o\cdot\left(1+\frac{D_{g1}}{D_{g2}}\right)\cdot I \tag{27}$$

where $D_{g1}=|g_{11}|^2+|g_{12}|^2$ and $D_{g2}=|g_{21}|^2=|g_{22}|^2$. Hence, the modified noise vector $\tilde{n}_1$ is also white.

2) the modified noise vector $\tilde{n}_2$ is also a zero mean Gaussian random vector with covariance $$R_{n2}=N_o\cdot\left(1+\frac{D_{h2}}{D_{h1}}\right)\cdot I \tag{28}$$

where $D_{h1}=|h_{11}|^2+|h_{12}|^2$ and $D_{h2}=|h_{21}|^2=|h_{22}|^2$, and hence it is also white.

3) The matrices $\tilde{H}$ and $\tilde{G}$ have the form $$\tilde{H}=\begin{bmatrix} \tilde{h}_1 & \tilde{h}_2 \\ \tilde{h}_2^* & -\tilde{h}_1^* \end{bmatrix}, \text{ and } \tilde{G}=\begin{bmatrix} \tilde{g}_1 & \tilde{g}_2 \\ \tilde{g}_2^* & -\tilde{g}_1^* \end{bmatrix}. \tag{29}$$

4) Conditioned on $G_1$ and $G_2$, the random variables $\tilde{h}_1$ and $\tilde{h}_2$ are both zero mean complex Gaussian random variables with variance $\sigma_h^2=1+D_{g1}/D_{g2}$.

5) Conditioned on $H_1$ and $H_2$, the random variables $\tilde{g}_1$ and $\tilde{g}_2$ are both zero mean complex Gaussian random variables with variance $\sigma_g^2=1+D_{h2}/D_{h1}$.

6) The modified channel matrices $\tilde{H}$ and $\tilde{G}$ have a structure similar to that in equation (5), i.e. the modified channel matrices $\tilde{H}$ and $\tilde{G}$ are orthogonal matrices.

Considering the modified received signal vector $\tilde{r}_1$, which contains signals only from transmitter 10, i.e., $$\tilde{r}_1 = \tilde{H} \cdot c + \tilde{n}_1, \tag{30}$$

it is noted that this expression resembles the expression in equation (4). Hence, in accordance with the principles disclosed therein, the optimum ML decoder for the symbols transmitted by terminal unit 10 evaluates an equation that is similar to the expression of equation (6), and is given by $$\hat{c} = \underset{\hat{c} \in C}{\operatorname{argmin}} \|\tilde{r}_1 - \tilde{H} \cdot \hat{c}\|^2. \tag{31}$$

The corresponding decoder uncertainty is given by $$\Delta_c = \|\tilde{r}_1 - \tilde{H} \cdot \hat{c}\|^2. \tag{32}$$

Moreover, since the channel Matrix $\tilde{H}$ is orthogonal, the ML decoder will also decompose into two separate rules for $c_1$ and $c_2$.

In a similar fashion, considering the modified received signal vector $\tilde{r}_2$, which contains signals only from transmitter 10, i.e., $$\tilde{r}_2 = \tilde{H} \cdot c + \tilde{n}_2, \tag{33}$$

it is noted that this expression resembles the expression in equation (4). Hence, the optimum ML decoder for the symbols transmitted by terminal unit 30 evaluates an equation that is similar to the expression of equation (6), and is given by $$\hat{s} = \underset{\hat{s} \in S}{\operatorname{argmin}} \|\tilde{r}_2 - \tilde{G} \cdot \hat{s}\|^2. \tag{34}$$

The corresponding decoder uncertainty is given by $$\Delta_s = \|\tilde{r}_2 - \tilde{G} \cdot \hat{s}\|^2. \tag{35}$$

Moreover, since the channel Matrix $\tilde{G}$ is also orthogonal, the ML decoder will also decompose into two separate rules for $s_1$ and $s_2$.

The above-disclosed technique can be easily implemented within a detector 25 that comprises a stored program general purpose processor. Specifically, a subroutine $(\hat{c}, \Delta)$=ZF.DECODE$(r_1, r_2, H_1, H_2, G_1, G_2)$ can be installed which returns the values $\hat{c}, \Delta$ in response to submitted inputs $r_1, r_2, H_1, H_2, G_1$, and $G_2$, as shown below:

---

$(\hat{c}, \Delta_c) = \text{ZF.DECODE}(r_1, r_2, H_1, H_2, G_1, G_2)$
{
$\quad \tilde{r} = r_1 - G_1 G_2^{-1} r_2$
$\quad \tilde{H} = H_1 - G_1 G_2^{-1} H_2$
$\quad \hat{c} = \underset{c \in C}{\arg\min} \|\tilde{r} - \tilde{H} \cdot c\|^2$
$\quad \Delta_c = \|\tilde{r} - \tilde{H} \cdot \hat{c}\|^2$
}

---

With such a subroutine, both $\hat{s}$ and $\hat{c}$ can be estimated, as follows:

$$(\hat{c}, \Delta) = \text{ZF.DECODE}(r_1, r_2, H_1, H_2, G_1, G_2) \tag{36}$$

$$(\hat{s}, \Delta) = \text{ZF.DECODE}(r_2, r_1, G_2, G_1, H_2, H_1). \tag{37}$$

It may be noted that knowledge of the noise power $N_0$ is not required. Simulation results reveal that the performance of the FIG. 1 system which employs the principles disclosed herein and the ZF.DECODE subroutine is equivalent to that when only one terminal unit exists and the base station uses a single receive antenna. That is, the reception is equivalent to the performance of two branch MRRC diversity receiver. Advantageously, however, the disclosed technique is able to support two co-channel terminal units.

The discussion above centered on describing the technique for canceling out the signal of transmitter 10 when detecting the signal of transmitter 30, and for canceling out the signal of transmitter 30 when detecting the signal of transmitter 10. Effectively, detector 25 of receiver 20 can either comprise two processors, with one making the subroutine call of equation (31) and the other making the subroutine call of equation (32). Alternatively, the signals can be stored within detector 25 and the subroutine calls of equations 31 and 32 can be made seriatim.

Minimum Mean-Squared Error IC and ML Decoding Scheme:

The above-disclosed approach for canceling the contribution of an interfering terminal unit is known as the zero-forcing (ZF) as a minimum mean-squared error technique (MMSE).

Recalling equation (20), the vector r can also be written as $$r = H \cdot \tilde{c} + n \tag{38}$$

where $\tilde{c} = [\hat{c}^T \hat{s}^T]^T$, $r = [\tilde{r}_1^T \tilde{r}_2^T]^T = [r_{11} \ r_{21}^* \ r_{12} \ r_{22}^*]^T$, and $$H = \begin{bmatrix} H_1 & G_1 \\ H_2 & G_2 \end{bmatrix} \tag{39}$$

To simplify notations, the vector r is also defined as $r = [r_1 \ r_2 \ r_3 \ r_4]^T$.

When seeking to detect and decode signals $\{c_1, c_2\}$ by minimizing a mean-squared error criterion, the goal is find a linear combination of the received signals such that the mean-squared error in detecting the signals $\{c_1, c_2\}$ is minimized. In general terms, this can be expressed by an error cost function that is to be minimized, such as the function $$J(\alpha, \beta) = \left\| \sum_{i=1}^{4} \alpha_i r_i - (\beta_1 c_1 + \beta_2 c_2) \right\|^2 = \|\alpha \cdot r - \beta \cdot c\|^2 \tag{40}$$

One may note that a minimum is certainly reached when both $\alpha$ and $\beta$ are equal to 0, but that, of course, is not desired. Therefore, either $\beta_1$ or $\beta_2$ is set to 1. When $\beta_2$ is set to 1, we get the following minimization criterion from equation (40)

$$J_1(\alpha_1, \beta_1) = \left\| \sum_{i=1}^{5} \alpha_{1i} r_{1i} - c_2 \right\|^2 = \|\tilde{\alpha}_1 \tilde{r}_1 - c_2\|^2 \tag{41}$$

where $\tilde{\alpha}_1=[\alpha_{11},\alpha_{12},\alpha_{13},\alpha_{14},-\beta_1]=[\alpha_1-\beta_1]$ and $\tilde{r}_1=[r^T c_1]^T$. From this it can be seen that $$\tilde{r}_1 = \begin{bmatrix} H & 0^T \\ 0 & 1 \end{bmatrix} \begin{bmatrix} \tilde{c} \\ c_1 \end{bmatrix} + \begin{bmatrix} n \\ 0 \end{bmatrix} = R \cdot d + \eta \quad (42)$$

where $0=[0\ 0\ 0\ 0]$.

What is needed is to select $\tilde{\alpha}_1$ so that the expected value of the expression in equation (41) is minimized. That is, select $\tilde{\alpha}_1$ to minimize $$E\{J_1(\tilde{\alpha}_1)\}=E\{(\tilde{\alpha}_1\tilde{r}_1-c_2)(\tilde{\alpha}_1\tilde{r}_1-c_2)^*\}. \quad (43)$$

Taking the partial derivative with respect to it, and setting it to zero, what results is $$\begin{bmatrix} M & h_1 \\ h_1^* & 1 \end{bmatrix} \begin{bmatrix} \alpha_1^* \\ -\beta_1 \end{bmatrix} = \begin{bmatrix} h_2 \\ 0 \end{bmatrix} \quad (44)$$

where $$M = HH^* + \frac{1}{\Gamma}I,$$

$\Gamma$ is the signal to noise ratio, I is the 4 by 4 identity matrix, $h_1$ is the first column of H, and $h_2$ is the second column of H. It follows that $$\alpha_1^*=(M-h_1h_1^*)^{-1}h_2 \text{ and } \beta_1^*=h_1^*(M-h_2h_1^*)^{-1}h_2. \quad (45)$$

It can be shown that $$(M-h_1h_1^*)^{-1} = M^{-1} - \frac{M^{-1}h_1h_1^*M^{-1}}{1-h_1^*M^{-1}h_1}, \quad (46)$$

which yields $$\beta_1^* = \frac{h_1^*M^{-1}h_2}{1-h_1^*M^{-1}h_1} \quad (47)$$

From the structure of the matrix H we can easily verify that $h_1$ and $h_2$ are orthogonal. Using this fact and the structure of the matrix M, it can be shown that $$\beta_1=0 \quad (48)$$

$$\alpha_1^*=M^{-1}h_2. \quad (49)$$

The value of $\Gamma$ and the values of $h_{ij}$ and $g_{ij}$, and consequently the values of H and M are obtained from a training sequence in a conventional manner by elements 23 and 24. Since, as indicated earlier, this is quite conventional and does not form a part of this invention, for sake of conciseness additional details are not presented. Hence, the MMSE IC solution given in equations (45) and (46) will minimize the mean-squared error in $c_2$ without any regard to $c_1$. Considering the alternative cost function when $\beta_1$ is set to 1, a similar analysis leads to the conclusion that $$\beta_2=0 \quad (47)$$

$$\alpha_2^*=M^{-1}h_1 \quad (48)$$

In this case, the MMSE IC solution given in equations (45) and (46) will minimize the mean-squared error in $c_1$ without any regard to $c_2$. Therefore, from equations (45)-(48), we can easily see that the MMSE interference canceller for signals from terminal unit 10 will consist of two different sets of weights $\alpha_1$ and $\alpha_2$ for $c_2$ and $c_1$, respectively. The weights for decoding signals from terminal 30 can be obtained in a similar fashion, as expected. Thus, the decoding of signals from terminal units 10 and 30 can be performed with a single subroutine MMSE.DECODE in decoder 25 as follows:

---

$(c,\Delta_c)$ = MMSE.DECODE$(r_1,r_2,H_1,H_2,G_1,G_2,\Gamma)$
{
$\tilde{r} = [r_1^T \quad r_2^T]^T$
$H = \begin{bmatrix} H_1 & G_1 \\ H_2 & G_2 \end{bmatrix}$ $M = HH^* + \frac{1}{\Gamma}I$ $h_1 = [h_{11}^T \quad h_{21}^T]^T$ = first column of H
$h_2 = [h_{12}^T \quad h_{22}^T]^T$ = second column of H
$\alpha_1^* = M^{-1}h_1, \alpha_2^* = M^{-1}h_2$
$c_1 = \arg\min_{\hat{c}_1 \in C}\|\alpha_1^*\tilde{r}-\hat{c}_1\|^2, c_2 = \arg\min_{\hat{c}_2 \in C}\|\alpha_1^*\tilde{r}-\hat{c}_2\|^2$
$\Delta_c = \|\alpha_1^*\tilde{r}-\hat{c}_1\|^2 + \|\alpha_1^*\tilde{r}-\hat{c}_2\|^2$
}

---

With such a subroutine, both s and e can be estimated, as follows:

$$(\hat{c},\Delta)=\text{MMSE.DECODE}(r_1,r_2,H_1,H_2,G_1,G_2,\Gamma) \quad (49)$$

$$(\hat{s},\Delta)=\text{MMSE.DECODE}(r_2,r_1,G_1,G_2,H_1,H_2,\Gamma) \quad (50)$$

Similar to the zero-forcing case, simulation results reveal that the performance of the disclosed technique MMSE.DECODE is equivalent to that when only one terminal unit exists and the base station uses a single receive antenna which is equivalent to the performance of two branch MRRC diversity. However, this technique is also able to support two co-channel terminal units. In addition, when the SIR (signal-to-interference ratio, which is a ratio between the desired terminal power to the interfering terminal power) increases, the MMSE approach will have a better performance as compared to the ZF case (the ZF performance is almost the same as the performance of the MMSE approach at 0 dB SIR).

Two-Step Interference Cancellation:

Actually, additional improvement can be realized by employing a two-step interference cancellation approach using either the zero-forcing or the MMSE interference cancellation techniques disclosed above. Below, we will describe this approach based on the MMSE technique. However, as one might expect, there is a similar approach based on the zero-forcing technique. In this two-step approach, the receiver decodes signals from both terminals using the subroutine MMSE.DECODE disclosed above. Assuming that symbols from the terminal unit 10 $\hat{c}_o$, have been decoded correctly, the receiver can then perfectly cancel the contribution of the terminal unit 10 in the received signal vectors $r_1$ and $r_2$. The receiver then uses $x_1$ and $x_2$, the received signal vectors after cancelling signals from terminal unit 10, to re-decode symbols from terminal unit 30 $\hat{s}_o$, using the optimum ML decoding rule in equation (10). Assuming that the symbols from terminal unit 10 have been decoded correctly, we can easily see that the performance for terminal unit 30 will be equivalent to that with 2 transmit and 2 receive antennas (which is equivalent to 4 branch MRC diversity). Let $\Delta_o=\Delta_{c_o}+\Delta_{s_o}$ denote the overall uncertainty for $\hat{c}_o$ and $\hat{s}_o$. The receiver then repeats the above step assuming that symbols from terminal unit 30 $\hat{s}_1$ have been decoded correctly using the MMSE.DECODE subroutine. As before, the receiver cancels the contribution of terminal unit 30 in the received signal vectors $r_1$ and $r_2$ and uses $y_1$ and $y_2$, the received signal vectors after cancelling signals from terminal unit 30, to re-decode symbols from terminal unit 10 $\hat{c}_1$ using the optimum ML decoding rule in equation (10). As before, assuming that symbols from terminal unit 30, the performance for terminal unit 10 will be equivalent to that with 2 transmit and 2 receive antennas. Similarly, let $\Delta_1 = \Delta_{c_1} + \Delta_{s_1}$ denote the overall uncertainty for $\hat{c}_1$ and $\hat{s}_1$. The receiver then compares the overall uncertainty and chooses the pair $(\hat{c}_o, \hat{s}_o)$ if $\Delta_o < \Delta_1$ and $(\hat{c}_1, \hat{s}_1)$ otherwise. The two-step interference cancellation approach based on the MMSE technique disclosed above is presented below in pseudo-code sub-routine II.MMSE.DECODE. As we mentioned earlier, the techniques can be also used with the zero-forcing approach. Below, we also present the pseudo code subroutine II.ZF.DECODE for the two-step interference cancellation based on the zero-forcing approach.

```
(ĉ,ŝ) = II. MMSE.DECODE(r₁,r₂,H₁,H₂,G₁,G₂,Γ)
{
  (ĉ₀,Δ_c,o) = MMSE.DECODE(r₁,r₂,H₁,H₂,G₁,G₂,Γ)
  x₁ = r₁ - H₁ · ĉ₀, x₂ = r₂ - H₂ · ĉ₀
  ŝ₀ = arg min (||x₁ - G₁ · s||² + ||x₂ - G₂ · s||²)
        s∈S
  Δ_s,o = ||x₁ - G₁ · s||² + ||x₂ - G₂ · s||²
  (ŝ₁,Δ_s,1) = MMSE.DECODE(r₁,r₂,G₁,G₂,H₁,H₂,Γ)
  y₁ = r₁ - G₁ · ŝ₁, y₂ = r₂ - G₂ · ŝ₁
  ĉ₁ = arg min (||y₁ - H₁ · c||² + ||y₂ - H₂ · c||²)
        c∈C
  Δ_c,1 = ||y₁ - H₁ · c||² + ||y₂ - H₂ · c||²
  If (Δ_c,o + Δ_s,o) < (Δ_c,1 + Δ_s,1) ⇒ (ĉ,ŝ) = (ĉ₀,ŝ₀)
  Else (ĉ,ŝ) = (ĉ₁,ŝ₁)
}
(ĉ,ŝ) = II. ZF.DECODE(r₁,r₂,H₁,H₂,G₁,G₂,)
{
  (ĉ₀,Δ_c,o) = ZF.DECODE(r₁,r₂,H₁,H₂,G₁,G₂,)
  x₁ = r₁ - H₁ · ĉ₀, x₂ = r₂ - H₂ · ĉ₀
  ŝ₀ = arg min (||x₁ - G₁ · s||² + ||x₂ - G₂ · s||²)
        s∈S
  Δ_s,o = ||x₁ - G₁ · s||² + ||x₂ - G₂ · s||²
  (ŝ₁,Δ_s,1) = ZF.DECODE(r₂,r₁,G₂,G₁,H₂,H₁)
  y₁ = r₁ - G₁ · ŝ₁, ŷ₂ = r₂ - G₂ · ŝ₁
  ĉ₁ = arg min (||y₁ - H₁ · c||² + ||y₂ - H₂ · c||²)
        c∈C
  Δ_c,1 = ||y₁ - H₁ · c||² + ||y₂ - H₂ · c||²
  If (Δ_c,o + Δ_s,o) < (Δ_c,1 + Δ_s,1) ⇒ (ĉ,ŝ) = (ĉ₀,ŝ₀)
  Else (ĉ,ŝ) = (ĉ₁,ŝ₁)
}
```

Interference Cancellation and ML Decoding: GENERAL CASE

In the above basic case, we focused on the basic case where we assumed two co-channel terminals (K=2) each uses two transmit antennas (N=2). Both terminals communicate with a base station that is equipped with two transmit antennas (M=2). In this section we will consider the more general case of K≥2 co-channel terminals each is equipped with N≥2 transmitting antennas, both terminals communicate with a base that has receive M≥K antennas. We will develop similar interference cancellation and ML decoding scheme for this case.

In a paper submitted to IEEE Transactions on Information Theory, Vahid Tarokh et al. extended the above space-time block coding scheme to the case when more than two antennas are used for transmission (N≥2). There, a technique for constructing space-time block codes (with similar properties to the simple scheme described above) was developed. It was also shown that for real constellations space-time block codes with transmission rate 1 can be constructed. However, for a general complex constellation the rate of transmission for these codes will be less than 1.

In general, let us assume that the input information symbols to the transmitter are grouped into groups of Q symbols $c_1, c_2, \ldots, c_Q$. A space-time block code in this case will map the symbols $c_1, c_2, \ldots, c_Q$ into an N×L array C whose entries are made $\pm c_1, \pm c_2, \ldots, \pm c_Q$ and $\pm c_1^*, \pm c_2^*, \ldots, \pm c_Q^*$. At time t, where $1 \leq t \leq L$, the t-th column of C is transmitted from the N antennas. In this case, the transmission rate of such code will be Q/L. In general, for a rate Q/L space-time block code (as constructed by V. Tarokh et al.) designed for N transmit antenna, let $r_1, r_2, \ldots, r_L$ be the received signals at time t=1, 2, …, L. As before, we define the received signal vector as $$r = [r_1 r_2 \ldots r_{L/2} r_{L/2+1}^* r_{L/2+2}^* \ldots r_L^*]^T \quad (51)$$

where the L×1 vector r can be written as $$r = H \cdot c + \eta \quad (52)$$

and H is the L×Q channel matrix whose entries are from $\pm h_1, \pm h_2, \ldots, \pm h_N, \pm h_1^*, \pm h_2^*, \ldots, \pm h_N^*$, and it is an orthogonal matrix, $c = [c_1 \, c_2 \ldots c_Q]^T$, and $\eta$ is an L×1 zero-mean complex Gaussian random vector with covariance $N_o \cdot I$ which models the noise. The ML decoder in this case is similar to that in equation (6), that is $$\hat{c} = \underset{\hat{c} \in C}{\operatorname{argmin}} \| r - H \cdot \hat{c} \|^2 \quad (53)$$

and the uncertainty, $\Delta_c$, of the decoded symbols $\hat{c}$ is given by $$\Delta_c = \| r - H \cdot \hat{c} \|^2. \quad (54)$$

As before, since the channel matrix H is orthogonal, the decoding rule in (53) decomposes into Q separate decoding rules for $c_1, c_2, \ldots, c_Q$. For example, assuming that the terminal unit uses 4 transmit antenna, a rate 4/8 (i.e. it is a rate 1/2) space-time block code is given by $$\begin{bmatrix} c_1 \\ c_2 \\ c_3 \\ c_4 \end{bmatrix} \rightarrow \begin{bmatrix} c_1 & -c_2 & -c_3 & -c_4 & c_1^* & -c_2^* & -c_3^* & -c_4^* \\ c_2 & c_1 & c_4 & -c_3 & c_2^* & c_1^* & c_4^* & -c_3^* \\ c_3 & -c_4 & c_1 & c_2 & c_3^* & -c_4^* & c_1^* & c_2^* \\ c_4 & c_3 & -c_2 & c_1 & c_4^* & c_3^* & -c_2^* & c_1^* \end{bmatrix}$$

In this case, at time t=1 $c_1, c_2, c_3, c_4$ are transmitted from antenna 1 through 4, respectively. At time t=2, $-c_2, c_1, -c_4, c_3$ are transmitted from antenna 1 through 4, respectively, and so on. For this example, let $r_1, r_2, \ldots, r_8$ be the received signals at time t=1, 2, …, 8. Define the received signal vector $r = [r_1 \, r_2 \, r_3 \, r_4 \, r_5^* \, r_6^* \, r_7^* \, r_8^*]^T$. In this case, we can write the received signal vector r can be written as $$r = H \cdot c + \eta \quad (55)$$

where $\eta$ is the 8×1 AWGN noise vector and H is the 8×4 channel matrix given by:

$$H = \begin{bmatrix} h_1 & h_2 & h_3 & h_4 \\ h_2 & -h_1 & h_4 & -h_3 \\ h_3 & -h_4 & -h_1 & h_2 \\ h_4 & h_3 & -h_2 & -h_1 \\ h_1^* & h_2^* & h_3^* & h_4^* \\ h_2^* & -h_1^* & h_4^* & -h_3^* \\ h_3^* & -h_4^* & -h_1^* & h_2^* \\ h_4^* & h_3^* & -h_2^* & -h_1^* \end{bmatrix} \quad (56)$$

We can immediately notice that the matrix H is orthogonal, that is $H^*H = D_h \cdot I$ where $$D_h = \sum_{i=1}^{4} |h_i|^2$$

and I is a 4×4 identity matrix.

Let us now assume a multi-user environment with K co-channel synchronized terminals. Each terminal uses a rate Q/L space-time block code with N transmit antenna (as constructed by V. Tarokh et al). The base station uses M≥K antennas for reception. We can write the received signal vector at the m-th receive antenna as $$r_m = \sum_{k=1}^{K} H_{km} \cdot c_k + \eta_m, \quad m = 1, 2, \ldots, M \quad (57)$$

where $H_{km}$ is the L×Q k-th user channel matrix to antenna m, $c_k = [c_{k1} c_{k2} \ldots c_{kQ}]^T$ is the Q×1 information symbols vector for k-th user, and $\eta_m$ is the L×1 noise vector. The entries of the k-th user channel matrix $H_{km}$ are from $\pm h_{k,m,1}, \pm h_{k,m,2}, \ldots, \pm h_{k,m,N}$ and $\pm h_{k,m,1}^*, \pm h_{k,m,2}^*, \ldots, \pm h_{k,m,N}^*$, where $h_{k,m,n}$ is the complex channel gain between transmit antenna n of the k-th user and receive antenna m. As we stated earlier, the matrix $H_{km}$ is orthogonal.

Zero-Forcing IC and ML Decoding:

Without loss of generality, let us assume that we are interested in suppressing signals from co-channel terminals 2, 3, . . . , K while decoding signals from the first terminal. This can be done in a successive manner as follows.

First, let us define $r_m^{(0)} = r_m$. Let us assume that we start by canceling out the contributions of the K-th terminal. We can use the M-th antenna received signal vector $r_M$ to cancel out the contribution of the K-th terminal in the remaining M−1 received signal vectors by forming the modified received signal vectors $r_m^{(1)}$, m=1, . . . , M−1 as follows:

$$r_m^{(1)} = r_m^{(0)} - H_{Km} H_{KM}^+ r_M^{(0)} \quad (58)$$

where $H_{km}^+$ is the generalized inverse of the channel matrix $H_{km}$ and is given by $$H_{km}^+ = (H_{km}^+ H_{km})^{-1} H_{km}^+ \quad (59)$$

We can easily verify that $H_{km}^+ h_{km} = I$, where I is the Q×Q identity matrix. We can easily verify that the modified received signal vectors $r_m^{(1)}$, m=1, . . . , M−1, do not contain any signal contribution due to the K-th user. Moreover, we can easily verify that $r_m^{(1)}$ can be written as $$r_m^{(1)} = \sum_{k=1}^{K-1} H_{km}^{(1)} \cdot c_k + \eta_m^{(1)}, \quad m = 1, 2, \ldots, M-1 \quad (60)$$

where $H_{km}^{(1)}$ and $\eta_m^{(1)}$ are given by $$H_{km}^{(1)} = H_{km}^{(0)} - H_{Km}^{(0)} (H_{Km}^{(0)})^+ H_{kM}^{(0)}, m=1,2,\ldots,M-1 \quad (61)$$

$$\eta_m^{(1)} = \eta_m^{(0)} - H_{Km}^{(0)} (H_{KM}^{(0)})^+ \eta_M^{(0)}, m=1,2,\ldots,M-1 \quad (62)$$

Moreover, it can be shown that for codes constructed by V. Tarokh et al, the modified channel matrix $H_{km}^{(1)}$ will have exactly the same structure as that of $H_{km}$. That is, the entries of the k-th user modified channel matrix $H_{km}^{(1)}$ are from $\pm h_{k,m,1}^{(1)}, \pm h_{k,m,2}^{(2)}, \ldots, \pm h_{k,m,N}^{(1)}$ and $\pm h_{k,m,1}^{(1)*}, \pm h_{k,m,2}^{(1)*}, \ldots, \pm h_{k,m,N}^{(1)*}$ where $h_{k,m,n}^{(1)}$ is the modified complex channel gain between transmit antenna n of the k-th user and receive antenna m, m=1, . . . , M−1. Hence, the modified channel matrix $H_{km}^{(1)}$ will be orthogonal as well.

It can then be observed that the expression for the M−1 modified received signal vector $r_m^{(1)}$ in equation (60) is the same as that in equation (57) except that we now have one less interfering terminal. In a similar fashion, we can cancel out the contributions of terminal K−1 and obtain M−2 modified received signal vectors $r_m^{(2)}$, m=1, . . . , M−2 that do not contain any contributions from terminals K-th and K−1. In general, after stage j, where j=1, 2, . . . , K−1 contributions from terminals K, K−1, . . . , K−j+1 are canceled out and we are left with M−j modified received signal vectors $r_m^{(j)}$, m=1, . . . , M−j, j=1, 2, . . . , K−1 that contain signals due to terminals 1, 2, . . . , K−j only. In this case, we will have $$r_m^{(j)} = \sum_{k=1}^{K-j} H_{k,m}^{(j)} \cdot c_k + \eta_m^{(j)}, \quad m = 1, 2, \ldots, M-j \quad (63)$$

where $H_{k,m}^{(j)}$ and $\eta_m^{(j)}$ are given by $$r_m^{(j)} = r_m^{(j-1)} - H_{K-j,m}^{(j-1)} (H_{K-j,M-j}^{(j-1)})^+ r_{M-j}^{(j-1)}, m=1,2,\ldots M-j \quad (64)$$

$$H_{k,m}^{(j)} = H_{k,m}^{(j-1)} - H_{K-j,m}^{(j-1)} (H_{K-j,M-j}^{(j-1)})^+ H_{k,M-j}^{(j-1)},$$
$$1 \leq m \leq M-j, 1 \leq k \leq K-j \quad (65)$$

$$\eta_m^{(j)} = \eta_m^{(j-1)} - H_{K-j,m}^{(j-1)} (H_{K-j,M-j}^{(j-1)})^+ \eta_{M-j}^{(j-1)},$$
$$m=1,2,\ldots,M-j \quad (66)$$

This process is repeated until we are left with M−K+1 modified received signal vectors $r_m^{(K-1)}$, m=1, . . . , M−K+1 that contain only contributions due to the first terminal. In this case we will have $$r_m^{(K-1)} = H_{1,m}^{(K-1)} c_1 + \eta_m^{(K-1)}, m=1,2,\ldots,M-K+1 \quad (67)$$

which contains signals due to the first terminal only. Similarly, the modified channel matrix $H_{1,m}^{(K-1)}$, m=1, 2, . . . , M−K+1, will have a similar structure and is also orthogonal. Hence, it is straight forward to see that the ML decoder for signals from the first terminal is given by $$\hat{c}_1 = \underset{\hat{c}_1 \in C}{\operatorname{argmin}} \sum_{m=1}^{M-K+1} \|r_m^{(K-1)} - H_{1,m}^{(K-1)} \cdot \hat{c}_1\|^2 \quad (68)$$

and the corresponding uncertainty will be given by $$\Delta_1 = \sum_{m=1}^{M-K+1} \|r_m^{(K-1)} - H_{1,m}^{(K-1)} \cdot \hat{c}_1\|^2 \quad (69)$$

Similarly, since the modified channel matrices $H_{1,m}^{(K-1)}$, $1 \leq m \leq M-K+1$ are orthogonal, as before, the decoding rule in (68) will decompose into Q separate rules for decoding $c_{11}$, $c_{12}$, . . . , $c_{1Q}$. We may observe that the basic case for zero-forcing IC and ML decoding that we discussed in detail earlier is a special case of the above approach.

```
(ĉ,Δ) = G_ZFDECODE({r_m}_{1≤m≤M}, {H_km}_{1≤k≤K,1≤m≤M})
{
  r_m^(0) = r_m, 1 ≤ m ≤ M
  H_{k,m}^(0) = H_{k,m}, 1 ≤ m ≤ M, 1 ≤ k ≤ K
  for j = 1 → K - 1
    M_j = M - j, K_j = K - j
    for i = 1 → M_j
      r_i^(j) = r_i^(j-1) - H_{Kj,i}^(j-1)(H_{Kj,Mj}^(j-1))^+ r_{Mj}^(j-1)
      H_{k,i}^(j) = H_{k,i}^(j-1) - H_{Kj,m}^(j-1)(H_{Kj,Mj}^(j-1))^+ H_{k,Mj}^(j-1), 1 ≤ k ≤ K_j
    end
  end
  ĉ = arg min_{ĉ∈C} ∑_{m=1}^{M-K+1} ||r_m^(K-1) - H_{1,m}^(K-1)·ĉ||^2
  Δ = ∑_{m=1}^{M-K+1} ||r_m^(K-1) - H_{1,m}^(K-1)·ĉ||^2
}
```

The above-disclosed technique can be easily implemented within a detector 25 that comprises a stored program general purpose processor. Specifically, a subroutine $(c,\Delta)=G\_ZF\_DECODE(\{r_m\}_{1\le m\le M},\{H_{km}\}_{1\le k\le K,1\le m\le M})$ can be installed which returns the values $c,\Delta$ in response to submitted inputs $\{r_m\}_{1\le m\le M}$ and $\{H_{km}\}_{1\le k\le K,1\le m\le M}$, as shown above.

Minimum Mean-Squared Error IC and ML Decoding Scheme:

The MMSE IC and ML decoding in the general case can be developed in a similar fashion as follows. We recall the received signal vector at the m-th receive antenna in equation (57)

$$r_m = \sum_{k=1}^{K} H_{km} \cdot c_k + \eta_m, \quad m = 1, 2, \ldots, M \tag{70}$$

This can be written in a matrix form as in equation (38)

$$r = H \cdot \tilde{c} + n \tag{71}$$

where $r=[r_1^T r_2^T \ldots r_M^T]^T$ is a ML×1 vector, $\tilde{c}=r=[c_1^T c_2^T \ldots c_K^T]^T$ is QK×1 a vector, $n=\eta=[\eta_1^T \eta_2^T \ldots \eta_M^T]^T$ is a ML×1 vector, and $$H = \begin{bmatrix} H_{11} & H_{21} & \ldots & H_{K1} \\ H_{12} & H_{22} & \ldots & H_{K2} \\ \vdots & \vdots & \ddots & \vdots \\ H_{1M} & H_{2M} & \ldots & H_{KM} \end{bmatrix} \tag{72}$$

is the ML×QK channel matrix. As before, we redefine the vector r as $r=[r_1 r_2 \ldots r_{ML}]^T$. As before, we assume that we are interested in decoding the symbols transmitted from terminal 1 $c_{11}, c_{12}, \ldots, c_{1Q}$. As before, when seeking to detect and decode signals $c_{11}, c_{12}, \ldots, c_{1Q}$ by minimizing a mean-squared error criterion, the goal is find a linear combination of the received signals such that the mean-squared error in detecting the signals $c_{11}, c_{12}, C_{1Q}$ is minimized. In general terms, this can be expressed by an error cost function that is to be minimized, such as the function $$J(\alpha, \beta) = \left\| \sum_{i=1}^{LM} \alpha_i r_i - \sum_{j=1}^{Q} \beta_j c_{1j} \right\|^2 = \|\alpha \cdot r - \beta \cdot c_1\|^2 \tag{73}$$

Similarly, as before we can see that one of the $\beta_j$, $1\le j\le Q$ must be set to 1 or else we get an all zero solution for $\alpha$ and $\beta$. Consider the case where we set $\beta_j=1$. Hence, in this case, the criteria to be minimized is $$J_j(\alpha_j, \beta_j) = \left\| \sum_{i=1}^{LM+Q-1} \alpha_{ji} r_{ji} - c_{1j} \right\|^2 = \|\tilde{\alpha}_j \tilde{r}_j - c_{1j}\|^2, \tag{74}$$

$$1 \le j \le Q$$

where $$\tilde{\alpha}_j = [\alpha_{j1}, \alpha_{j2}, \ldots, \alpha_{jLM}, -\beta_1, \ldots -\beta_{j-1}, -\beta_{j+1}, \ldots, -\beta_Q] = [\alpha_j - \beta_j] \tag{75}$$

$$\tilde{r}_j = [r_j^T c_{11} \ldots c_{1j-1} c_{1j+1} \ldots c_{1Q}]^T \tag{76}$$

If we follow the same steps as in the basic case, we arrive at the conclusion that $$\beta_i(j) = 0 \quad i = 1, \ldots Q, \quad i \ne j \tag{77}$$
$$\qquad = 1 \quad i = j$$

$$\alpha_j^* = M^{-1} h_j, 1 \le j \le Q \tag{78}$$

where $h_j$ is the j-th column of the channel matrix H, and $$M = HH^* + \frac{1}{\Gamma}I,$$

is an ML×ML matrix, $\Gamma$ is the signal to noise ratio, and I is the ML×ML identity matrix.

In this case, as before, the error in decoding the j-th symbol $c_{1j}$ will be minimized without any regard to the other symbols. Hence, the MMSE-IC and ML decoder will consist of Q different combiners, one for each symbol. It should be clear now that the MMSI-IC solution for the general case is a straight forward extension to the basic case shown earlier. The MMSE-IC solution for the general case can be implemented using the subroutine G_MMSE.DECODE shown below.

```
(ĉ,Δ) = G_MMSEDECODE({r_m}_{1≤m≤M}, {H_km}_{1≤k≤K,1≤m≤M}, Γ)
{
  r = [r_1^T r_2^T ... r_M^T]^T
  H = [ H_11  H_21  ...  H_K1 ]
      [ H_12  H_22  ...  H_K2 ]
      [  :     :    ·.    :   ]
      [ H_1M  H_2M  ...  H_KM ]
  M = HH* + (1/Γ)I
  for j = 1 → Q
    h_j = j-th column of H
    α_j* = M^{-1} h_j
    c_j = arg min_{ĉ_j∈C} ||α_j*r - ĉ_j||^2
    Δ_j = ||α_j*r - ĉ_j||^2
  end
  ĉ = [c_1  c_2  ...  c_Q]^T
  Δ = ∑_{j=1}^{Q} Δ_j
}
```

What is claimed is:

1. An apparatus comprising:
a channel estimator configured to generate estimates of channel characteristics between M receiver antennas and K synchronized terminal units that each transmit on N antennas; and
a decoder configured to estimate symbols that were transmitted by each of the K synchronized terminal units based on the estimates of channel characteristics, the decoder being configured to estimate the symbols by suppressing signals from all but a corresponding terminal unit of the K synchronized terminal units, where K, M, and N, are integers, $2 \leq K \leq M$, and $N > 1$,
wherein the decoder is configured to estimate the symbols based on maximum likelihood decoding and one of zero forcing interference cancellation and minimum mean-squared error interference cancellation,
wherein at least one of the decoder and the channel estimator comprise:
a processor; and
a memory configured to store at least one corresponding sequence of instructions executable on the processor, the at least one corresponding sequence of instructions including at least one of a sequence executable to estimate the symbols and a sequence executable to generate the estimates, respectively.

2. The apparatus, as recited in claim 1, wherein the decoder is configured to generate an associated uncertainty measure.

3. The apparatus, as recited in claim 1, wherein the estimates of channel characteristics include K×M channel estimates.

4. The apparatus, as recited in claim 1, wherein the decoder is configured to estimate the symbols based on zero forcing interference cancellation.

5. The apparatus, as recited in claim 1, wherein the decoder is configured to estimate the symbols based on minimum mean-squared error interference cancellation.

6. The apparatus, as recited in claim 1, wherein the symbols were transmitted using N space-time block codes transmitted over L time intervals from each corresponding terminal unit of the K synchronized terminal units.

* * * * *